United States Patent
Niemark

(10) Patent No.: US 7,964,670 B2
(45) Date of Patent: Jun. 21, 2011

(54) FILM COMPRISING AN ETHYLENE/ALPHA-OLEFIN COPOLYMER AND ITS USE IN MEDICAL OR HYGIENIC APPLICATIONS

(75) Inventor: Godfried J. F. Niemark, Amstenrade (NL)

(73) Assignee: Teknor Apex Company, Pawtucket, RI (US)

( * ) Notice: Subject to any disclaimer, the term of this patent is extended or adjusted under 35 U.S.C. 154(b) by 827 days.

(21) Appl. No.: 10/570,254

(22) PCT Filed: Sep. 2, 2004

(86) PCT No.: PCT/EP2004/009817
§ 371 (c)(1),
(2), (4) Date: Oct. 17, 2006

(87) PCT Pub. No.: WO2005/023909
PCT Pub. Date: Mar. 17, 2005

(65) Prior Publication Data
US 2007/0112137 A1 May 17, 2007

(30) Foreign Application Priority Data
Sep. 5, 2003 (EP) .................................. 03020173

(51) Int. Cl.
*C08L 23/06* (2006.01)
*C08L 23/10* (2006.01)

(52) U.S. Cl. ........................................ 525/191; 525/240
(58) Field of Classification Search .................. 525/191, 525/240
See application file for complete search history.

(56) References Cited

U.S. PATENT DOCUMENTS

| | | | |
|---|---|---|---|
| 4,722,973 A * | 2/1988 | Yamaoka et al. | 525/240 |
| 5,100,947 A | 3/1992 | Puydak et al. | |
| 5,349,005 A * | 9/1994 | Tanaka | 524/490 |
| 6,335,095 B1 * | 1/2002 | Sugimoto et al. | 428/402 |
| 2002/0132956 A1 | 9/2002 | Matayoshi et al. | |
| 2008/0200615 A1 * | 8/2008 | Niemark et al. | 525/240 |

FOREIGN PATENT DOCUMENTS

| | | |
|---|---|---|
| EP | 0 393 993 | 10/1990 |
| JP | 04-185652 | 7/1992 |
| JP | 04-185658 | 7/1992 |
| JP | 05-078529 | 3/1993 |
| JP | 11-140248 | 5/1999 |

OTHER PUBLICATIONS

Notice of Reasons of Rejection, Japanese Patent Office, Appln. No. P2006-525112, Sep. 14, 2010.

* cited by examiner

*Primary Examiner* — Nathan M Nutter
(74) *Attorney, Agent, or Firm* — Nixon & Vanderhye P.C.

(57) ABSTRACT

The present invention relates to a film comprising a composition of an ethylene/alpha-olefin copolymer and a thermoplastic elastomer. The thermoplastic elastomer is for example a styrene or a polyolefin based thermoplastic elastomer. Preferably the thermoplastic elastomer is a polyolefin based thermoplastic elastomer comprising a polyolefin and a rubber in which the rubber is dynamically vulcanized by the use of a curing agent. The ethylene/alpha-olefin copolymer has a density from about 0.88 to about 0.91 g/cm3 and comprises from 90-65 parts by weight ethylene and from 10-35 parts by weight of an alpha-olefin having from 3 to 8 carbon atoms. The film comprises a composition with from 35-80 parts by weight of the ethylene/alpha-olef in copolymer and 65-20 parts by weight of the dynamically vulcanized thermoplastic elastomer wherein said parts by weight are based upon 100 parts by weight of the ethylene/alpha-olefin copolymer and the thermoplastic elastomer. The invention further relates to the use of the film in diapers, bandages, gloves, surgical drapes, hospital linens, diaper waistbands, site panel composites and site tabs.

16 Claims, No Drawings

FILM COMPRISING AN ETHYLENE/ALPHA-OLEFIN COPOLYMER AND ITS USE IN MEDICAL OR HYGIENIC APPLICATIONS

This application is the US national phase of international application PCT/EP2004/009817 filed 2 Sep. 2004 which designated the U.S. and claims benefit of EP 03020173.5, dated 5 Sep. 2003, the entire content of which is hereby incorporated by reference.

The present invention relates to a film comprising an ethylene/alpha-olefin copolymer. The present invention also relates to the use of a film comprising an ethylene/alpha-olefin copolymer in soft touch, medical or hygienic applications.

Films comprising ethylene/alpha-olefin copolymers are known from U.S. Pat. No. 5,464,905. In U.S. Pat. No. 5,464,905 it is described that if films from ethylene/alpha-olefin copolymers are moulded at high speed, an ethylene/alpha-olefin copolymer with a high melt tension has to be used in order to conduct high speed moulding without fluctuation or tearing of bubbles. Moreover, it is known that if an ethylene/alpha-olefin copolymer is chosen with a molecular weight distribution (MWD) of 2 or less, a good transparency is achieved but processability is less efficient. If on the other hand an ethylene/alpha-olefin copolymer is chosen with an MWD of 3 or more, the film is better processable but will be less transparent. The prior art in fact shows that it is difficult to achieve films comprising ethylene/alpha-olefin copolymers with a good performance.

The object of the present invention is to provide a film comprising an ethylene/alpha-olefin copolymer with improved performance.

This object is achieved by a film comprising a composition of an ethylene/alpha-olefin copolymer and a dynamically vulcanised thermoplastic elastomer comprising a rubber and a polyolefine whereby the weight ratio polyolefin to ethylene/alpha-olefin copolymer is below or equal to 0.6.

Surprisingly, it has been found that a film comprising this composition shows an improved elastic behaviour. The films show a decreased permanent deformation after stretching and better stress strain properties.

A further advantage of the film according to the present invention is that it shows a very smooth, silky surface, so that the films are very well suited for medical or hygienic applications. A further advantage of the film according to the present invention is that it shows fewer wrinkles after crumpling.

The ethylene/alpha-olefin copolymers in the film according to the present invention for example refer to a class of ethylene based copolymers with a density of less than about 0.93 g/cm$^3$ at a molecular weight (Mw) greater than about 20,000 g/mol. The ethylene/alpha-olefin copolymers preferably have densities from about 0.86 to about 0.92 g/cm$^3$. More preferably the ethylene/alpha-olefin copolymers have densities from about 0.88 to about 0.91 g/cm$^3$.

The ethylene/alpha-olefin copolymer according to the present invention for example comprises from 95 to 67 parts by weight ethylene and from 5 to 37 parts by weight of an alpha-olefin having from 3 to 8 carbon atoms. Preferably the ethylene/alpha-olefin copolymer comprises from 92 to 65 parts by weight ethylene and from 8 to 35 parts by weight of an alpha-olefin having from 3 to 8 carbon atoms. More preferable the ethylene/alpha-olefin copolymer comprises from 90 to 65 parts by weight ethylene and from 10 to 35 of an alpha-olefin having from 3 to 8 carbon atoms. Examples of alpha-olefins having 3 to 8 carbon atoms are propene, 1-butene, 1-pentene, 1-hexene, and 1-octene. Preferably 1-butene or 1-octene is used as alpha-olefin. Commercially available copolymers are for example EXACT™ or ENGAGE™.

Examples of ethylene/alpha-olefin copolymers include ethylene/1-butene, ethylene/1-pentene, ethylene/1-hexene, ethylene/1-octene, and ethylene/2-norbornene. The ethylene alpha-olefin copolymers can have a narrow molecular weight distribution for example from 1.5 to 3, preferably from 1.8 to 3.0 and more preferably from 1.9 to 2.8. The narrow molecular weight distribution can be achieved by use of a polymerisation system whereby a single site catalyst is used, including for example a metallocene catalyst.

The ethylene/alpha-olefin copolymers of the present invention for example have a peak melting temperature of less than 120° C. More preferably from about 55-100° C.

The thermoplastic elastomer in the film according to the present invention is dynamically vulcanised and comprises a rubber and a polyolefin.

Examples of the polyolefin are homopolymers of ethylene or propylene, copolymers of ethylene and propylene, copolymers of ethylene and an alpha-olefin comonomer with 4-20 carbon atoms or copolymers of propylene and an alpha-olefin comonomer with 4-20 carbon atoms. In case of a copolymer, the content of propylene in said copolymer is preferably at least 75 wt. %. The polyolefin homo- and copolymers may be prepared with a Ziegler-Natta catalyst, a metallocene catalyst or with another single site catalyst. Preferably, polypropylene, polyethylene or mixtures thereof are used as polyolefin. More preferably polypropylene is used as polyolefin. The polypropylene may be linear or branched. Preferably a linear polypropylene is used. The Melt flow index (MFI) of the polypropylene preferably is between 0.1 and 50; more preferably between 0,3-20 (according to ISO standard 1133 (230° C.; 2.16 kg load)).

The amount of polyolefin is for example less than 15% by weight relative to the total weight the thermoplastic elastomer. Preferably the amount of polyolefin is between 1-12% by weight, more preferably between 5-9% by weight relative to the total weight the thermoplastic elastomer.

Examples of rubbers that are suitable in the polyolefin based thermoplastic elastomer according to the present invention are ethylene-propylene copolymers, hereinafter called EPM, ethylene-propylene-diene terpolymers, hereinafter called EPDM, styrene butadiene rubber, nitrile butadiene rubber, isobutene-isoprene rubber, styrene-ethylene/styrene-butadiene block copolymers, butyl rubber, isobutylene-p-methylstyrene copolymers or brominated isobutylene-p-methylstyrene copolymers, natural rubber or blends of these.

Preferably, EPDM or EPM is used as rubber. Most preferably, EPDM is used as rubber. The EPDM preferably contains 50-70 parts by weight ethylene monomer units, 48-30 parts by weight monomer units originating from an alpha-olefin and 2-12 parts by weight monomer units originating from a non-conjugated diene. As alpha-olefin use is preferably made of propylene. As non-conjugated diene use is preferably made of dicyclopentadiene (DCPD), 5-ethylidene-2-norbornene (ENB) or vinylnorbornene (VNB).

The rubber is dynamically vulcanised in the presence of a curing agent such as, for example sulfur, sulfurous compounds, metal oxides, maleimides, phenol resins or peroxides. These curing agents are known from the state of the art and are described in for example U.S. Pat. No. 5,100,947. It is also possible to use siloxane compounds as curing agent, examples are hydrosilane or vinylalkoxysilane. The rubber in the film according to the present invention is preferably vulcanised with peroxides as curing agent. Examples of suitable peroxides are organic peroxides for example dicumyl peroxide, di-tert-butylperoxide, 2,5-dimethyl-(2,5-di-tert-butylperoxy)hexane, 1,3-bis(tert-butylperoxyisopropyl)benzene, 1,1-bis(tert-butylperoxy)-2,3,5-trimethylcyclohexane, benzoyl peroxide, 2,4-dichlorobenzoyl peroxide, tert-butyl peroxybenzoate, tert-butyl peroxyisopropylcarbonate, diacetyl peroxide, lauroyl peroxide, tert-butyl cumyl peroxide.

The amount of peroxide is preferably between 0.02-5% by weight and more preferably between 0.05-2% by weight relative to the total weight of the thermoplastic elastomer. Films prepared from peroxide vulcanised thermoplastic elastomers show a good transparency.

The degree of vulcanization of the rubber can be expressed in terms of gel content. The gel content is the ratio of the amount of non-soluble rubber and the total amount of rubber (in weight) of a specimen soaked in an organic solvent for the rubber. A method for measuring the gel content is described in U.S. Pat. No. 5,100,947.

Herein a specimen is soaked for 48 hours in an organic solvent for the rubber at room temperature. After weighing of both the specimen before soaking and its residue, the amount of non-soluble elastomer and total elastomer can be calculated, based on knowledge of the relative amounts of all components in the thermoplastic elastomer composition. The rubber in the dynamically vulcanised polyolefin based thermoplastic elastomer according to the present invention is at least partly vulcanised and for instance has a gel content between 60 and 100%.

Preferably the rubber is vulcanised to a gel content higher than 70%. More preferably to a gel content higher than 90%. Even more preferably the rubber is vulcanised to a gel content of at least 95%. Most preferably the rubber is vulcanised to a gel content of about 100%.

The dynamically vulcanised thermoplastic elastomer can be prepared by melt mixing and kneading the polyolefin, the rubber and optionally additives customarily employed by one skilled in the art. Melt mixing and kneading may be carried out in conventional mixing equipment for example roll mills, Banbury mixers, Brabender mixers, continuous mixers for example a single screw extruder, a twin screw extruder and the like. Preferably, melt mixing is carried out in a twin-screw extruder. After the polyolefin, the rubber and optionally additives have been properly dispersed; the vulcanisation agent is added to initiate the dynamic vulcanisation. The dynamically vulcanised thermoplastic elastomer in the film of the present invention may also be prepared by melt mixing the polyolefin, the rubber and optionally additives in one step. By one step is meant that the polyolefin, the rubber, the curing agent and optionally other additives are fed by feeders to a continuous mixer at the same time. An oil may for example be added before, during or after the vulcanisation. The oil may however also be added partly before and partially after the vulcanisation. Preferably the oil is added after the vulcanisation. The dynamically vulcanised thermoplastic elastomer for example has hardness below 55 shore A. Preferably a hardness below 50 shore A. More preferably a hardness below 45 shore A.

The composition comprising the ethylene/alpha-olefin copolymer and the dynamically vulcanised thermoplastic elastomer can be prepared by melt mixing and kneading masterbatches of the ethylene/alpha-olefin copolymer and the thermoplastic elastomer. The composition may also be prepared by preparing the dynamically vulcanised thermoplastic elastomer and adding the ethylene/alpha-olefin copolymer before, during or after the vulcanisation.

The thermoplastic elastomer in the film according to the present invention optionally contains customary additives. Examples of such additives are reinforcing and non-reinforcing fillers, plasticizers, antioxidants, stabilizers, oil, antistatic agents, waxes, foaming agents, pigments, flame retardants and other known agents and are described in the Rubber World Magazine Blue Book, and in Gaether et al., Plastics Additives Handbook (Hanser 1990). Examples of suitable fillers are calcium carbonate, clay, silica, talc, titanium dioxide, and carbon.

Examples suitable oils are paraffinic oil, naphthenic oil, aromatic oil obtained from petroleum fractions. As paraffinic oil for example Sunpar™ oil may be used. Also highly hydrogenated oil in which the concentration of aromatic compounds is preferably less than 4 wt. % and the concentration of polar compounds is less than 0.3 wt. % may be used. An example of such oil is PennzUltra™ 1199, supplied by Pennzoil in the United States of America. Another additive that can optionally be added is a Lewis base such as for instance a metal oxide, a metal hydroxide, a metal carbonate or hydrotalcite.

The additives can optionally be added during the preparation of the thermoplastic elastomer. The quantity of additive to be added is known to one skilled in the art. Preferably the quantity of additives is chosen in that way that it does not impair the properties of the film.

The films according to the present invention may be processed by a conventional method for example blown or cast film processes including blown film.

Films for example include blown or cast films in monolayer or multilayer constructions formed by coextrusion or by lamination or by extrusion coating. The composition of the ethylene/alpha-olefin copolymers and the thermoplastic elastomer is preferably extruded in a molten state through a flat die and then cooled to form sheets or cast films. Alternatively, the composition may be extruded in a molten state through an annular die and then blown and cooled to form a tubular film. The tubular film may be axially slit and unfolded to form a flat film. The films of the invention may be unoriented, uniaxially oriented or biaxially oriented.

The films of the present invention may be single layer or multi-layer films. The multi-layer films may comprise one or more layers formed from the composition of the invention. The films according to the present invention usually have a thickness ranging from 20-500 micrometer. Preferably, the films have a thickness ranging from 35-200 micrometer.

Multi-layer films may be formed by methods well known in the art. If all layers are polymers, the polymers may be co-extruded through a coextrusion feedblock and die assembly to yield a film with two or more layers adhered together but differing in composition. Extrusion coating whereby a substrate material is contacted with the hot molten polymer as the polymer exits the die may also form multi-layer films.

Combining two or more single layer films prepared as described above may also form multi-layer films. The layers of a film so formed may be adhered together with an adhesive or by the application of heat and pressure.

The films according to the present invention may comprise from 30-90 parts by weight of the ethylene/alpha-olefin copolymer and 70-10 parts by weight of the thermoplastic elastomer wherein said parts by weight are based upon 100 parts by weight of the ethylene/alpha-olefin copolymer and the thermoplastic elastomer. Preferably, the films comprise from 40-85 parts by weight of the ethylene/alpha-olefin copolymer and 60-15 parts by weight of the thermoplastic elastomer wherein said parts by weight are based upon 100 parts by weight of the ethylene/alpha-olefin copolymer and the thermoplastic elastomer. Even more preferably the films comprise from 50-80 parts by weight of the ethylene/alpha-olefin copolymer and 50-20 parts by weight of the thermoplastic elastomer wherein said parts by weight are based upon 100 parts by weight of the ethylene/alpha-olefin copolymer and the thermoplastic elastomer.

A preferred embodiment of the invention are films comprising a composition of an ethylene/alpha-olefin copolymer and a dynamically vulcanised thermoplastic elastomer comprising rubber and polypropylene whereby the weight ratio polypropylene to ethylene/alpha-olefin copolymer is below or equal to 0.6. Even more preferred are films comprising an ethylene/alpha-olefin copolymer and a dynamically vulcanised thermoplastic elastomer comprising rubber and polypropylene whereby the weight ratio polypropylene to ethylene/alpha-olefin copolymer is below or equal to 0.5. It has been found that the compositions provide films with very good properties, eg tear strength, good seal properties, excellent transparency and decreased permanent deformation after stretching.

The present invention further relates to the use of the films according to the present invention in soft touch, hygienic or medical applications for example in diapers, bandages, gloves, surgical drapes, hospital linens, diaper waist bands, site panel composites, site tabs, grips, buttons, automotive parts, toothbrush handles, shoe soles, skins, toys, wine corks, gaskets, furniture mouldings and the like.

The invention will be elucidated by means of the following examples and comparative experiment without being limited thereto.

By the determination of elastic recovery and permanent deformation of stretch wrap film ASTM D 5459 test was used under the following conditions;
Point of load application cycle: 100%
Waiting time: 60 s.
Recovery period at point of load removal: 180 s.
Cycle speed: 127 mm/min.

EXAMPLE I

A dynamically vulcanised thermoplastic elastomer with a hardness of 30 shore A (SARLINK 6135 EF) was blended with an ethylene/butylenes copolymer (EXACT 8201) in a weight ratio of 60:40. The blend was processed by blow moulding into an elastic film with a thickness of 60 micron. After stretching the film by 100% in X and Y-direction, the permanent deformation after 300 s dwelling time was measured. Also the tensile strain needed to stretch was measured. Results are given in table 1.

EXAMPLE II

A dynamically vulcanised thermoplastic elastomer with a hardness of 30 shore A (SARLINK 6135 EF) was blended with an ethylene/butylene copolymer (EXACT 8201) in a weight ratio of 80:20. The blend was processed by blow moulding into an elastic film with a thickness of 60 micron. After stretching the film by 100% in X and Y-direction, the permanent deformation after 300 s dwelling time was measured. Also the tensile strain needed to stretch was measured. Results are given in table 1.

Comparative Experiment A

An ethylene-butylene copolymer EXACT 8201 was processed by blow moulding into an elastic film with a thickness of 60 micron. After stretching the film by 100% in X and Y-direction, the permanent deformation after 300 s dwelling time was measured. Also the tensile strain needed to stretch was measured. Results are given in table 1.

TABLE 1

|  | Example I | Example II | Comparative experiment A |
|---|---|---|---|
| Permanent deformation X (%) | 10 | 15 | 20 |
| Permanent deformation Y (%) | 15 | 20 | 30 |
| Tensile strain X (Mpa) | 10 | 30 | 100 |
| Tensile strain Y (Mpa) | 7 | 20 | 80 |

As can be seen from the above table the addition of a dynamically vulcanised thermoplastic elastomer improves the permanent deformation in the X and Y direction with respectively 100% (example 1) and 50% (example 2) in comparison with the comparative experiment A. Furthermore the force needed to stretch the films comprising the dynamically vulcanised thermoplastic elastomer is considerably lower. The manufactured films of example 1 and 2 show an excellent silky feel and smooth appearance even after several crumpling the film together.

The invention claimed is:

1. A film comprising an ethylene/alpha-olefin copolymer melt-blended with a dynamically pre-vulcanised thermoplastic elastomer comprising a rubber component and a polyolefin component, wherein the weight ratio of polyolefin component of the pre-vulcanised thermoplastic elastomer to the ethylene/alpha-olefin copolymer is 0.6 or below, and wherein the alpha-olefin of the ethylene/alpha-olefin copolymer is an alpha-olefin having from 4 to 8 carbon atoms.

2. The film according to claim 1, wherein the weight ratio of the polyolefin component of the dynamically pre-vulcanised thermoplastic elastomer to the ethylene/alpha-olefin copolymer is 0.5 or below.

3. The film according to claim 1, wherein the dynamically pre-vulcanised thermoplastic elastomer has a hardness below 55 shore A.

4. The film according to claim 1, wherein the polyolefin component of the pre-vulcanised thermoplastic elastomer is polypropylene.

5. The film according to claim 4, wherein the polypropylene is present in an amount of less than 15 wt % relative the total weight of the dynamically pre-vulcanised thermoplastic elastomer.

6. The film according to claim 5, comprising from 35-80 parts by weight of the ethylene/alpha-olefin copolymer and 65-20 parts by weight of the dynamically vulcanised thermoplastic elastomer.

7. The film according to claim 1, wherein the ethylene/alpha-olefin copolymer has a density from about 0.86 to about 0.92 g/cm³.

8. A product for soft touch applications, consumer applications, medical applications or hygienic applications which comprises the film according to claim 1.

9. The product according to claim 8, wherein the product is in the form of diapers, bandages, gloves, surgical drapes, hospital linens, diaper waistbands, site panel composites or site tabs.

10. The film according to claim 1, wherein the ethylene/alpha-olefin copolymer is at least one selected from the group consisting of ethylene-1-butene, ethylene/1-pentene, ethylene/1-hexene, ethylene/1-octene and ethylene/2-norborene.

11. A film comprising an ethylene/alpha-olefin copolymer melt-blended with a dynamically pre-vulcanised thermoplastic elastomer comprising a rubber component and a polyolefin component, wherein the weight ratio of the polyolefin component of the dynamically pre-vulcanised thermoplastic elastomer to the ethylene/alpha-olefin copolymer is 0.6 or below, and wherein the ethylene/alpha-olefin copolymer comprises from 95 to 67 parts by weight of ethylene and from 5 to 37 parts by weight of an alpha-olefin having from 4 to 8 carbon atoms.

12. The film according to claim 11, wherein the ethylene/alpha-olefin copolymer comprises from 92 to 65 parts by weight of ethylene and from 8 to 35 parts by weight of the alpha-olefin.

13. The film according to claim 12, wherein the ethylene/alpha-olefin copolymer comprises from 90 to 65 parts by weight of ethylene and from 10 to 35 of the alpha-olefin.

14. The film according to claim 10, wherein the alpha-olefin of the ethylene/alpha-olefin copolymer is propene, 1-butene, 1-pentene, 1-hexene or 1-octene.

15. A product for soft touch applications, consumer applications, medical applications and hygienic applications which comprises the film according to claim 10.

16. The product according to claim 15, wherein the product is in the form of diapers, bandages, gloves, surgical drapes, hospital linens, diaper waistbands, site panel composites or site tabs.

* * * * *